United States Patent
B R et al.

(10) Patent No.: US 11,048,249 B2
(45) Date of Patent: Jun. 29, 2021

(54) CONTROLLING AND MAINTAINING OPERATIONAL STATUS DURING COMPONENT FAILURES

(71) Applicants: Chethan Ravi B R, Karnataka (IN); Bony Mathew, Karnataka (IN); Birgit Obst, Munich (DE)

(72) Inventors: Chethan Ravi B R, Karnataka (IN); Bony Mathew, Karnataka (IN); Birgit Obst, Munich (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 219 days.

(21) Appl. No.: 16/048,273

(22) Filed: Jul. 28, 2018

(65) Prior Publication Data

US 2019/0033850 A1 Jan. 31, 2019

(30) Foreign Application Priority Data

Jul. 28, 2017 (EP) .................................. 17183815

(51) Int. Cl.
*G05B 23/02* (2006.01)
*G01D 5/24* (2006.01)
(Continued)

(52) U.S. Cl.
CPC ..... *G05B 23/0297* (2013.01); *G01D 5/24457* (2013.01); *G05B 9/02* (2013.01);
(Continued)

(58) Field of Classification Search
None
See application file for complete search history.

(56) References Cited

U.S. PATENT DOCUMENTS 5,386,373 A 1/1995 Keeler et al.
5,604,841 A * 2/1997 Hamilton ............ G06F 11/2257
706/11
(Continued)

FOREIGN PATENT DOCUMENTS

CN 101027617 A 8/2007
CN 101331504 A 12/2008
(Continued)

OTHER PUBLICATIONS

Yuan, K.; Xiao, F.; Fei, L.; Kang, B.; and Deng, Y., "Modeling Sensor Reliability in Fault Diagnosis Based on Evidence Theory", Nov. 29, 2015, Sensors 2016, 16, 113; doi: 10.3390/s16010113. (Year: 2015).*

(Continued)

*Primary Examiner* — Mohammad Ali
*Assistant Examiner* — Kelvin Booker
(74) *Attorney, Agent, or Firm* — Lempia Summerfield Katz LLC

(57) ABSTRACT

A system, a control unit, and a method for controlling operation of a technical system are provided. The technical system includes a plurality of sensors. The method includes receiving first sensor data from a first sensor of the plurality of sensors. The method includes detecting a first sensor anomaly based on failure of the first sensor to generate the first sensor data. The failure of the first sensor includes generation of anomalous first sensor data. The method also includes validating the first sensor anomaly based on a comparison between the first sensor data and a virtual first sensor data. Thereafter, a control command is generated to the technical system by replacing the virtual first sensor data in lieu of the first sensor data when the first sensor anomaly is validated.

16 Claims, 5 Drawing Sheets

(51) Int. Cl.
*G05B 9/02* (2006.01)
*G05B 17/02* (2006.01)
*G01D 5/244* (2006.01)

(52) U.S. Cl.
CPC ......... *G05B 17/02* (2013.01); *G05B 23/0221* (2013.01); *G05B 23/0262* (2013.01)

(56) References Cited

U.S. PATENT DOCUMENTS

| | | | |
|---|---|---|---|
| 9,533,683 B2 | 1/2017 | Lavoie | |
| 10,423,884 B2 * | 9/2019 | Hyde | G06F 30/20 |
| 2005/0222747 A1 * | 10/2005 | Vhora | G05B 23/0254 701/100 |
| 2007/0118338 A1 | 5/2007 | Grichnik | |
| 2007/0244841 A1 | 10/2007 | Vatchkov et al. | |
| 2008/0039993 A1 * | 2/2008 | Cleary | G06N 5/02 701/32.7 |
| 2013/0173028 A1 * | 7/2013 | Felty | G05B 13/02 700/79 |
| 2014/0257666 A1 | 9/2014 | Abrol | |
| 2016/0237810 A1 * | 8/2016 | Beaman, Jr. | E21B 41/00 |
| 2016/0357895 A1 * | 12/2016 | Hyde | G06F 30/20 |
| 2017/0193143 A1 * | 7/2017 | Saha | G06F 11/004 |
| 2017/0212499 A1 | 7/2017 | Kameta et al. | |
| 2017/0243413 A1 * | 8/2017 | Haggerty | G07C 5/0841 |
| 2017/0293710 A1 * | 10/2017 | Haggerty | G06F 30/17 |
| 2018/0136995 A1 * | 5/2018 | Sheppard | G06F 11/0709 |
| 2019/0026252 A1 * | 1/2019 | Allmaras | G05B 17/02 |
| 2019/0196460 A1 * | 6/2019 | Rosea | G06N 5/022 |
| 2019/0365332 A1 * | 12/2019 | Fedichev | G16H 20/60 |
| 2020/0301799 A1 * | 9/2020 | Manivasagam | G06T 17/20 |
| 2020/0319259 A1 * | 10/2020 | Pressman | G05B 23/0235 |

FOREIGN PATENT DOCUMENTS

| | | | | |
|---|---|---|---|---|
| JP | 5026433 B2 | | 9/2012 | |
| JP | 2016512294 A | | 4/2016 | |
| KR | 100363335 B1 * | | 12/2002 | G06F 9/44 |
| KR | 20170127430 A * | | 11/2017 | G05B 23/02 |
| WO | WO2016120112 A1 | | 8/2016 | |
| WO | 2016183332 A1 | | 11/2016 | |

OTHER PUBLICATIONS

Adithya Thaduri, "Physics-of-Failure Based Performance Modeling of Critical Electronic Components", 2013, Doctoral Thesis, Division of Operation and Maintenance Engineering, Luleå University of Technology, Luleå, Sweden (Year: 2013).*

Thanyawalai Sujidkul, "Multi-Physics Modeling of Multifunctional Composite Materials for Damage Detection", Dec. 2013, Doctoral Thesis, The Graduate Faculty of the University of Akron. (Year: 2013).*

Chethan Ravi B.R and Dr. Venkateswaran P., "Effects of Solvers on Finite Element Analysis in COMSOL Multiphysics®", Nov. 2014, Proceedings of the 2014 COMSOL Conference in Bangalore. (Year: 2014).*

Rauscha, C.; Nahangib, M.; Haasa, C.; and Lianga, W., "Monte Carlo simulation for tolerance analysis in prefabrication and offsite construction", Nov. 5, 2018, Automation in Construction 103 (2019) 300-314. (Year: 2015).*

Pillai, P.; Kaushik, A.; Bhavikatti, S.; Roy, A. and Kumar, V., "A Hybrid Approach for Fusing Physics and Data for Failure Prediction", 2016, International Journal of Prognostics and Health Management, ISSN 2153-2648, 2016 025 (Year: 2016).*

Muhlheim, M.D.; Cetiner, S.M.; Flanagan, G.F.; and Poore III, W.P., "Integration of Advanced Probabilistic Analysis Techniques With Multi-Physics Models", Jun. 30, 2014, Oak Ridge National Laboratory, US Department of Energy under contract DE-AC05-00OR22725. (Year: 2014).*

Kumar, A. and Viassolo, D., "Model-Based Fault Tolerant Control", Sep. 2008, NASA/CR—2008-215273. (Year: 2008).*

Korean Office Action for Korean Application No. 10-2018-0087903 dated Feb. 13, 2020.

Chinese Office Action for Chinese Application No. 201810845879.8 dated Dec. 25, 2020.

* cited by examiner

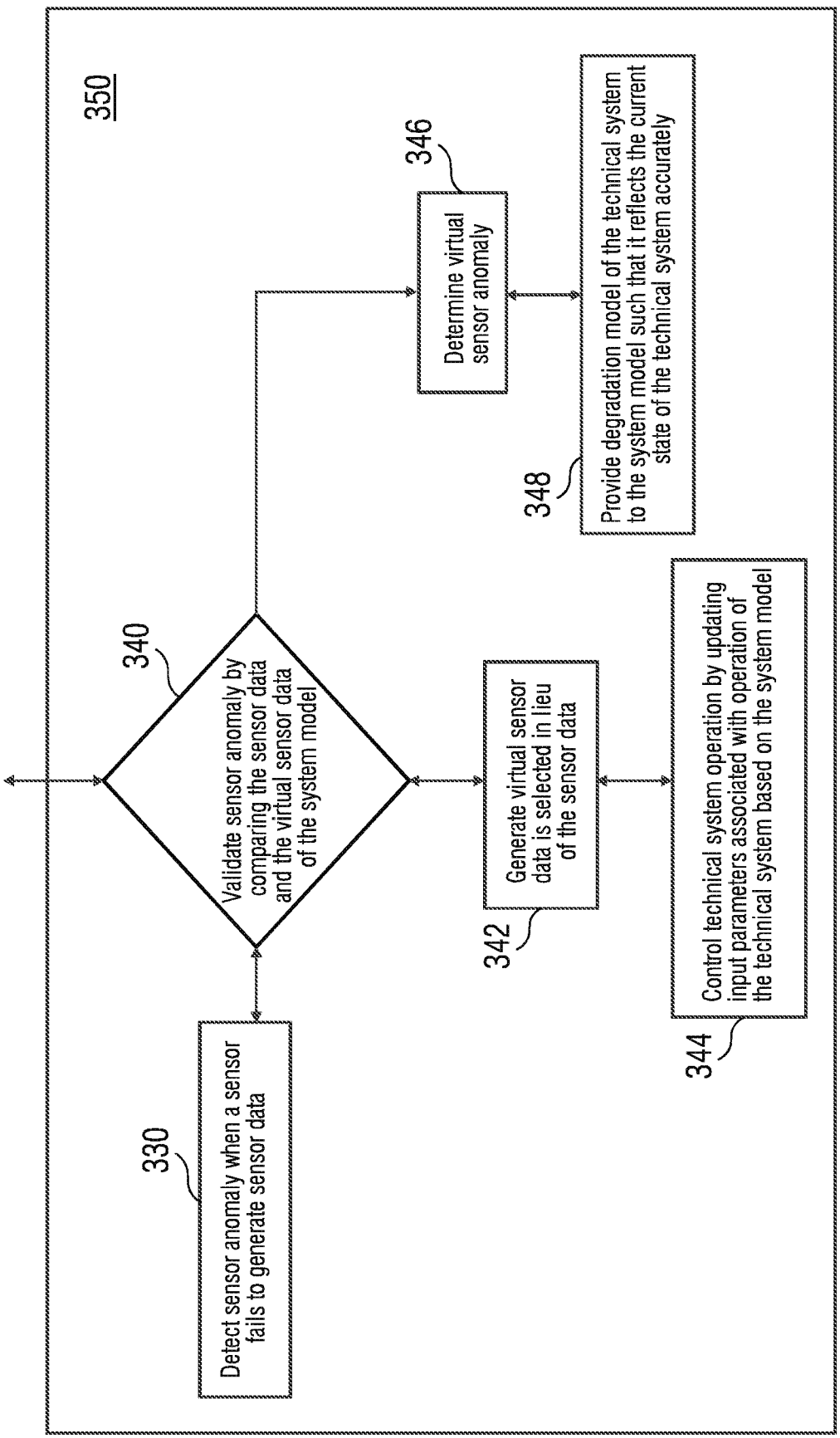
FIG 3 (Contd...)

CONTROLLING AND MAINTAINING OPERATIONAL STATUS DURING COMPONENT FAILURES

This application claims the benefit of EP17183815.4, filed on Jul. 28, 2017, which is hereby incorporated by reference in its entirety.

BACKGROUND

This present embodiments relate to controlling operation of a technical system by overcoming failures of sensors in the technical system in real-time.

In a technical system, a plurality of sensors are used to continuously monitor and collect data. The sensor data is important to monitor and control a process as the sensor data helps to validate that the technical system is behaving in an expected manner.

Over a period of time, the sensors may lose accuracy or may fail during certain critical processes. In such scenarios, the technical system may need to be stopped. In the manufacturing industry, failure of a single device may hamper the accuracy of manufactured product. This may invariably result in loss of time and money.

Such a method of overcoming sensor failure is taught in the patent U.S. Pat. No. 9,533,683 B2. The method disclosed therein relates to a failure hitch angle sensor in a vehicle. The failure of the hitch angle sensor is mitigated by generating a countermeasure command for the vehicle when the hitch angle fails to be sensed. The above method is limited to one parameter of hitch angle and does not consider additional parameters hamper the processes in the technical system.

WO 2016120112 A1 describes a method of detecting, classifying, and/or mitigating sensor error. The sensor fault mitigation is also performed on identified bias, drift, multiplicative calibration error, precision degradation, and spike error. The method disclosed suggests that in the event of complete sensor failure, certain mitigation methods may be employed. However, the down time in such a method may be considerable, and the technical system is not invulnerable to the sensor failure.

SUMMARY AND DESCRIPTION

The scope of the present invention is defined solely by the appended claims and is not affected to any degree by the statements within this summary.

The present embodiments may obviate one or more of the drawbacks or limitations in the related art. For example, down time is minimized and a limitation of the sensors is overcome by generating a control command to the technical system by replacing the virtual first sensor data in lieu of the first sensor data.

The method, device, and system according to one or more of the present embodiments detect a first sensor anomaly based on failure of the first sensor to generate the first sensor data. The first sensor anomaly is then validated based on a comparison between the first sensor data and virtual first sensor data. The control command to the technical system is generated by replacing the virtual first sensor data in lieu of the first sensor data when the first sensor anomaly is validated.

According to one or more of the present embodiments, a computer implemented method for controlling operation of a technical system including a plurality of sensors is provided. The method includes receiving sensor data in time series. The sensor data includes data points or sensor values corresponding to at least one operation parameter associated with the technical system. In an embodiment, the plurality of sensors includes a first sensor and accordingly, first sensor data from the first sensor is received.

As used herein, the term "data"/"dataset" refers to data that a sensor records. The data recorded by the sensor is for a particular period of time. In the present embodiment, the sensor records the data with a time stamp. The data includes multiple data points, each representing a recording of the electronic device. As used herein, "sensor data" and "data point" may be used interchangeably to provide a representation of one or more datums recorded for the at least one operative parameter associated with the technical system. The "at least one operation parameter" refers to one or more characteristics of the technical system. For example, if a gas turbine is the technical system, the at least one operation parameter includes combustion temperature, inlet pressure, exhaust pressure, etc. In another example, a motor is the technical system, and accordingly, the at least one operation parameter includes rotation speed, temperature, etc. As used herein, the first sensor is used merely for illustration purposes. The acts may be performed on the plurality of sensors in the technical system.

The method employs a control unit for controlling operation of the technical system. The control unit includes a receiver to receive the sensor data in time series from the plurality of sensors. The control unit also includes a processor and a memory communicatively coupled to the processor. The memory includes an anomaly detection module to detect anomalies in the sensor data. For example, the anomaly is detected when the first sensor fails to generate the first sensor data. There are several instances when the first sensor fails to generate the first sensor data at a time instance. As used herein, the first sensor failure may be attributed to the first sensor being jammed or damaged. Therefore, the first sensor is unable to generate the first sensor data or generates anomalous first sensor data for that time instant. In another example, the first sensor is configured to generate the first sensor data at a preset time interval and is unable to generate the first sensor data for the time instance.

The control unit includes a validation module to validate the sensor data anomaly. Considering the example of the first sensor data being anomalous, the first sensor anomaly is validated based on a comparison between the first sensor data and a virtual first sensor data. The virtual first sensor data is a simulated data of the first sensor. The virtual first sensor data is generated from a system model of the technical system.

Further, the control unit includes a sensor selection module that outputs the virtual first sensor data in lieu of the first sensor data when the first sensor anomaly is validated.

According to an embodiment, the processor is configured to receive the virtual first sensor data from the sensor selection module to generate a control command to the technical system based on the virtual first sensor data. Accordingly, operation of the technical system is continued based on the virtual first sensor data.

According to another embodiment, the control unit includes a model generator module that is configured to generate the system model of the technical system. The system model is generated based on a multi-physics probability model. In one embodiment, the system model is a high fidelity simulation model of the technical system that is generated based on Bayesian calibration. Bayesian calibration provides parameter estimates and uncertainty of parameters. Bayesian calibration allows for all sources of uncertainty and attempts to correct for any inadequacy of the system model, revealed by discrepancy between the sensor data and the system model. The advantage of Bayesian calibration is the ability to integrate the sensor data and historical data of the technical system to form a posterior distribution estimate of a quantity of interest. Bayesian calibration is used to update the probability for a hypothesis as more data or information becomes available. Prior distribution and likelihood distribution are inputs to Bayesian calibration, and posterior distribution is the output from the Bayesian calibration.

The system model is used to generate virtual sensor data for the plurality of sensors. Based on the operation of the technical system, the system model is updated with the sensor data from the plurality of sensors to reflect a current state of the technical system. Accordingly, the system model is configured as a virtual replica of the technical system. Additionally, the system model is used to update input parameters provided to the technical system. The update of the input parameters may effect change in the sensor data.

According to another embodiment, the control unit includes a virtual anomaly detection module to detect a virtual sensor anomaly when the sensor anomaly validation is false. For example, if the first sensor anomaly is not validated, then this indicates that there is an anomaly in the virtual first sensor data. In an embodiment, the virtual first sensor anomaly is attributed to degradation of the technical system that has not been accounted for in the system model. In another embodiment, the virtual first sensor anomaly is due to reconfiguration of the technical system.

When the virtual first sensor anomaly is detected, it is determined whether the technical system has been reconfigured, and accordingly, the system model is re-calibrated. Typically, the technical system reconfiguration is determined if the virtual first sensor anomaly detection is discontinuous. If the virtual first sensor anomaly is continuous, then the degradation of the technical system may be assumed, and the system model is updated with a degradation model of the technical system. The degradation model is based on a continuous-time stochastic process and uncertainty quantification.

According to yet another embodiment, the control unit includes a sensor limit module to determine sensor limits based on operation limits of the technical system by a supervised learning model. The control unit also includes a tolerance deviation module to determine the tolerance deviation for each sensor of the plurality of sensors based on the supervised learning model. The tolerance deviation is an acceptable deviation from the sensor limits.

For example, consider the technical system of a motor. After performing various experiments on the motor, within corresponding operating limits, the limits for the temperature sensors and the tachometer is set. The temperature sensor limits may be Amax=100 degree Celsius, Bmax=120 degree Celsius, Cmax=130 degree Celsius, and the engine speed sensor limit may be Dmax=300 rpm. The tolerance deviation of +/−5 degree Celsius and +/−10 rpm is defined after analyzing various operating conditions and output of the sensors. The tolerance deviation is dynamically defined based on the current state of the technical system.

According to an embodiment, the control unit includes a sensor sensitivity module and a sensor relationship module. The sensor sensitivity module is configured to perform a perturbation analysis on each sensor of the plurality of sensors to determine sensor sensitivity for each of the plurality of sensors. The perturbation analysis allows study of changes in characteristics of a function when small perturbations are seen in the function's parameters. In other words, the perturbation analysis refers to how a neural network output is influenced by an input and/or weight perturbations (e.g., how the system model varies based on the changes in the sensor datasets). In an embodiment, the perturbation analysis involves measurement of the sensitivities based on the evaluation of the Taylor Series Expansion (TSE) of the cost function that is the Residual Sum-of-Squares (RSS), with appropriate approximations that are necessary for the application.

Based on the sensor sensitivity, the sensor relationship module determines the sensor relationship model using a neural network. The sensor relationship model is used to validate the sensor anomaly. For example, the detection of one or more anomalies in the sensor data from sensors surrounding the first sensor may be used to determine the first sensor anomaly. Alternatively, if the sensor data from the sensors surrounding the first sensor data is aligned with the virtual sensor data, except for the first sensor data, then the first sensor anomaly may be validated. Accordingly, the sensor relationship model is helpful to validate sensor anomaly.

The control unit and the method described may also be used to control processes that include several technical systems. For example, the control unit is used to control an industrial process such as a manufacturing process. The control unit generates system models for each of the technical systems performing the industrial process.

Sensor data of the technical systems represents the input/output of a subsequent technical system. The sensor data are compared with virtual sensor data in the system models. If a deviation more than the pre determined tolerance deviation occurs, then the control unit determines the sensor with the anomaly and accordingly determines the faulty technical system. If a fault is determined, the control unit uses the virtual sensor data instead of the sensor data. Further, the input/output values are updated to the subsequent technical system and in the system model.

The present embodiments are advantageous, as failure of any sensor in the technical system will not affect the overall process. Accordingly, down time of operation of the technical system may be reduced significantly. Further, the present embodiments may be used to overcome the limitations of the sensors.

The above-mentioned and other features of the present embodiments will be addressed with reference to the accompanying drawings. The illustrated embodiments are intended to illustrate, but not limit the invention.

DETAILED DESCRIPTION

Figure 1:
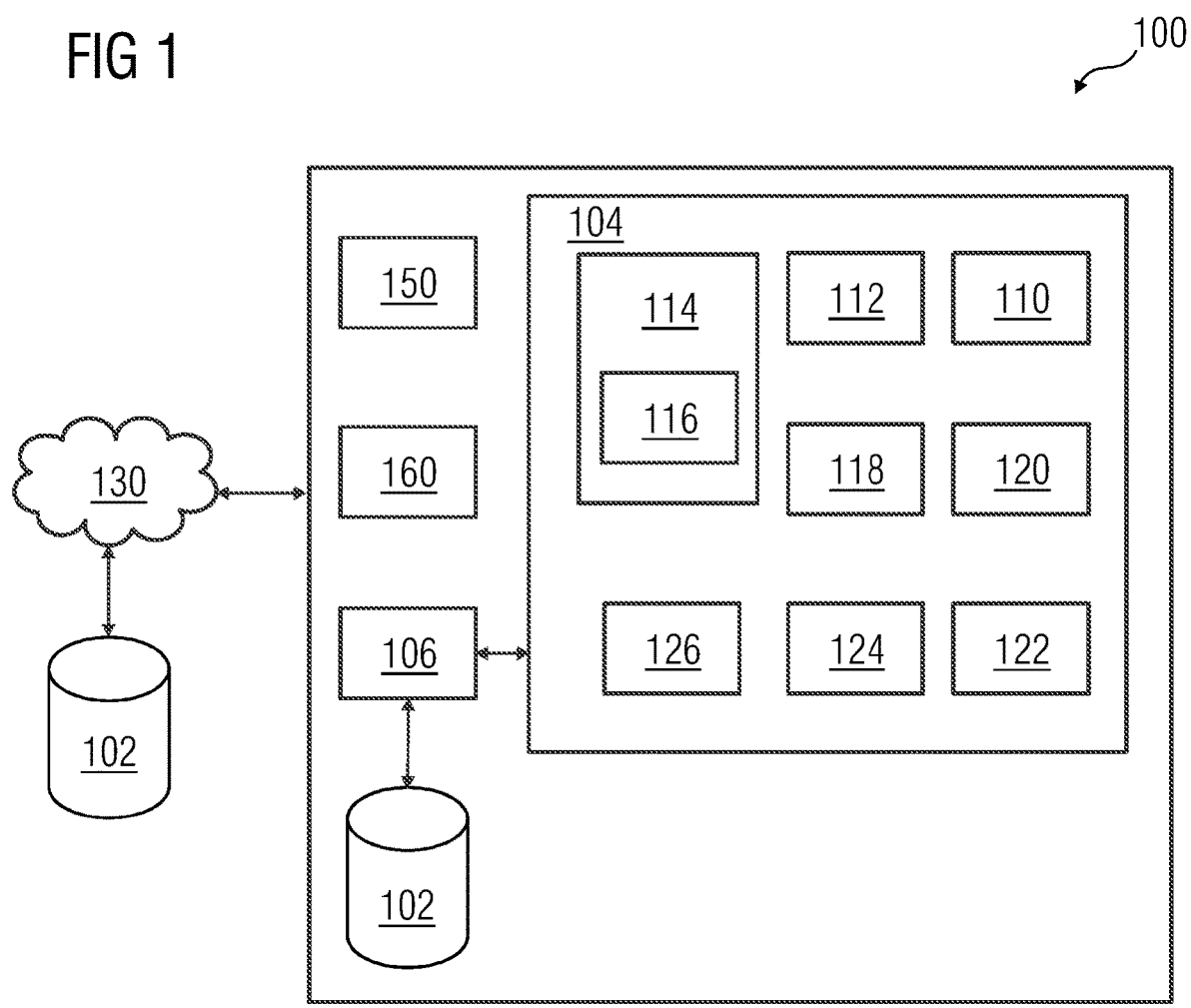
FIG. 1 illustrates one embodiment of a control unit for controlling a technical system.

Various embodiments are described with reference to the drawings, where like reference numerals are used to refer to like elements throughout. In the following description, a large gas turbine has been considered as an example of a technical system for the purpose of explanation. Further, numerous specific details are set forth in order to provide thorough understanding of one or more of the present embodiments. These examples are not to limit the application of the invention to large gas turbine, and the present embodiments include any technical system that is capable of overcoming limitation of the sensors. Such embodiments may be practiced without these specific details.

FIG. 1 illustrates a control unit 100 for controlling a technical system. The technical system used for explaining is a motor. However, the technical system is not limited to a motor and may include any system with multiple sensors, such as a gas turbine. The control unit 100 according to one or more of the present embodiments is installed on and accessible by a user device (e.g., a personal computing device, a workstation, a client device, a network enabled computing device, any other suitable computing equipment, and combinations of multiple pieces of computing equipment). The control unit 100 disclosed herein is in operable communication with a database 102 over a communication network 130.

The database 102 is, for example, a structured query language (SQL) data store or a not only SQL (NoSQL) data store. In an embodiment of the database 102, the database 102 may also be a location on a file system directly accessible by the control unit 100. In another embodiment of the database 102, the database 102 is configured as a cloud based database implemented in a cloud computing environment, where computing resources are delivered as a service over the network 130. As used herein, "cloud computing environment" refers to a processing environment including configurable computing physical and logical resources (e.g., networks, servers, storage, applications, services, etc., and data distributed over the network 130, such as the Internet). The cloud computing environment provides on-demand network access to a shared pool of the configurable computing physical and logical resources. The communication network 130 is, for example, a wired network, a wireless network, a communication network, or a network formed from any combination of these networks.

In one embodiment, the control unit 100 is downloadable and usable on the user device. In another embodiment, the control unit 100 is configured as a web based platform (e.g., a website hosted on a server or a network of servers). In another embodiment, the control unit 100 is implemented in the cloud computing environment. The control unit 100 is developed, for example, using Google App engine cloud infrastructure of Google Inc., Amazon Web Services® of Amazon Technologies, Inc., as disclosed hereinafter in FIG. 2. In an embodiment, the control unit 100 is configured as a cloud computing based platform implemented as a service for analyzing data.

The control unit 100 disclosed herein includes memory 104 and at least one processor 106 communicatively coupled to the memory 104. As used herein, "memory" refers to all computer readable media (e.g., non-volatile media, volatile media, and transmission media except for a transitory, propagating signal). The memory is configured to store computer program instructions defined by modules (e.g., elements 110, 114, 116, 118, etc., of the control unit 100). The processor 106 is configured to execute the defined computer program instructions in the modules. Further, the processor 106 is configured to execute the instructions in the memory 104 simultaneously. As illustrated in FIG. 1, the control unit 100 includes a receiver 150 to receive the sensor dataset in time series and a display unit 160. Additionally, a user using the user device may access the control unit 100 via a graphic user interface (GUI). The GUI is, for example, an online web interface, a web based downloadable application interface, etc.

The modules executed by the processor 106 include a model generator module 110, a sensor limit module 112, an anomaly detection module 114, a tolerance deviation module 118, a sensor selectivity module 120, a sensor relationship module 122, a validation module 124 and a sensor selection module 126.

The operation of the control unit 100 takes place in two stages, a pre-operation stage and an operation stage. During the pre-operation stage, the model generator module 110 generates a system model of the technical system. The system model is a high fidelity simulation model of the technical system that replicates the functionality and operation of the technical system in real time. The system model includes virtual sensor data for each of the sensors in the technical system.

The sensor limits module 112 determines sensor limits for the sensors in the technical system based on experiments that are conducted on the system. The sensor limits are then used by the tolerance deviation module 118 to determine acceptable deviation from the sensor limits. This tolerance is determined based on the experiments and supervised learning.

In an embodiment, the sensor sensitivity module 120 is used to determine the sensor sensitivity for each of the sensors in the technical system. The sensor sensitivity is determined by a perturbation analysis. The perturbation analysis allows study of changes in characteristics of a function when small perturbations are seen in the function's parameters. In other words, the perturbation analysis refers to how a neural network output is influenced by its input and/or weight perturbations (e.g., how the system model varies based on the changes in the sensor datasets).

The sensor sensitivity is used by the sensor relationship module 122 to determine sensor relationship between the sensors. The sensor relationship model may be used to validate anomaly in the sensor data generated by the sensors.

The anomaly in the sensor data is detected by the anomaly detection module 114. The anomaly is detected in the operation stage of one or more of the present embodiments. The anomaly detection module 114 detects sensor anomaly based on failure of the sensor to generate the sensor data. The anomaly detection module 114 also includes a virtual anomaly detection module 116. The virtual anomaly detection module 116 is used to detect anomalies the virtual sensor data (e.g., the system model).

The validation module 124 is used to validate whether the sensor anomaly is true or false based on the system model and the sensor relationship model. The validation module also determines whether there is a virtual sensor anomaly. The sensor selection module 126 is used to select the sensor data or the virtual sensor data depending on whether the sensor anomaly is validated. If the sensor data is validated, then the virtual sensor data is transmitted in lieu of the sensor data. The operation of the control unit 100 is explained further in FIGS. 2 and 3.

Figure 2:
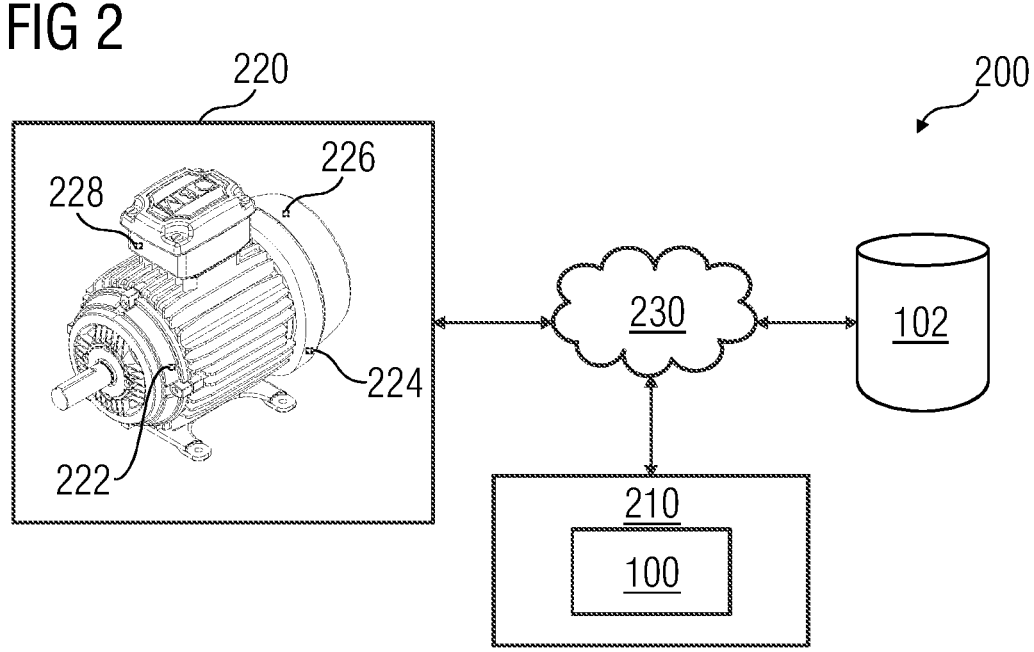
FIG. 2 illustrates one embodiment of a system including having the control unit of FIG. 1.

FIG. 2 illustrates a system 200 including a server 210. The sever 210 includes the control unit 100 in FIG. 1. The system 200 also includes a network interface 230 communicatively coupled to the server 210 and a motor 220 communicatively coupled to the server 210 via the network interface 230. The motor 220 is located in a remote location, while the server 210 is located on a cloud server, for example, using Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. The motor 220 includes sensors 222-228. The sensors 222, 224, 226 and 228 are used to generate sensor data including sensor values corresponding to one or more operation parameters associated with the motor 220. For example, the motor 200 includes a motor body temperature sensor (A) 222, an engine temperature sensor (B) 224, an air temperature sensor (C) 226 and a tachometer (D) 228.

During the pre-operational phase, a digital twin for the motor 220 is created by the model generator 110 of the control unit 100. After performing various experiments, limits for the temperature sensors 222-226 and the tachometer 228 is set in the sensor limits module 112. For example, the sensor limits for the sensors 222, 224, and 226 are Amax=100° C., Bmax=120° C., and Cmax=130° C., respectively. The limit for the tachometer 228 is Dmax=300 rpm. After the experiments, a tolerance of +/−5 degree Celsius and +/−10 rpm is defined by the tolerance deviation module 118 after studying the results for all operational mission cycles. The tolerance is defined after analyzing performance of the motor 220 for the operation mission cycles.

Further, in the pre-operation phase, relation between the sensors 222, 224 and 226 is also determined by the sensor sensitivity module 120 and the sensor relationship module 122. The relation between the temperature sensors 222-226 with the tachometer 228 is also defined by the sensor relationship module 122. For example, for a value of D=100 rpm, the temperature sensors 222, 224 and 226 may be in the following range based on known empirical relation A=45-55° C., B=55-65° C., C=65-75° C. for the input Ia=2.9-3.2 Ampere and Va=210-230 V.

During the operational phase, the sensor data of the sensors 222-228 are continuously compared with virtual sensor data in the system model. For example, the sensor data for 222 is A 50° C., sensor B 224 is 60° C., sensor C 226 is 70° C., and sensor D 228 is 85 rpm with input current of 2.9 Ampere and voltage of 220V. The virtual sensor data in the system model for sensors 222-228 are 51° C., 60° C., 71° C. and 100 rpm, respectively. Comparing the sensor data 85 rpm with the virtual sensor data 100 rpm for the tachometer 228, the difference is above the tolerance of +/−10 rpm.

In order to provide that it is a sensor fault, the sensor anomaly is validated by the validation module 124. The validation module 124 checks for the relation defined between the sensors 222, 224, 226 and 228 to validate whether the sensor D 228 in motor 220 is faulty. When the sensor D 228 is validated as faulty, then the sensor selection module 126 considers the virtual sensor data (e.g., 100 rpm) instead of the sensor data (e.g., 85 rpm). An operator of the motor 220 is also notified with a message regarding this switching.

At each stage, the system model is updated by the model generator module 110 with the sensor data. For example, in the above case, the input parameter Ia in the actual motor is 2.9 Ampere, while in the system model Ia=3 Ampere. The model generator module 110 takes into account this variation and updates the system mode.

In another example, the motor 220 requires 120 rpm from the motor 220 without increasing the temperature at sensors 222, 224 and 226 above 100, 120 and 130° C., respectively. The control unit 100 provides this by changing the duty cycle of the motor 220. Further, the model generator module 110 may be used to set a user or process requirements as inputs in the system model to run parallel simulations that determine under what conditions the process requirements may be met. The simulations are used to generate estimated inputs that may be input to the motor 220 as a control parameter to control the motor 220 operation.

In yet another example, the temperature sensors 222-226 are capable of providing the temperature at a period of every 5 second. If there is a requirement of determining the temperature at every 3 second period, then the system model with the virtual sensor data is used to provide the temperature for the sensors 222-226. Accordingly, the control unit 100 of the system 200 is capable of overcoming the limitations of the temperature sensors 222-226 in the motor 220. The acts performed to overcome the sensor limitations are elaborated by a flowchart in FIG. 3.

Figure 3:
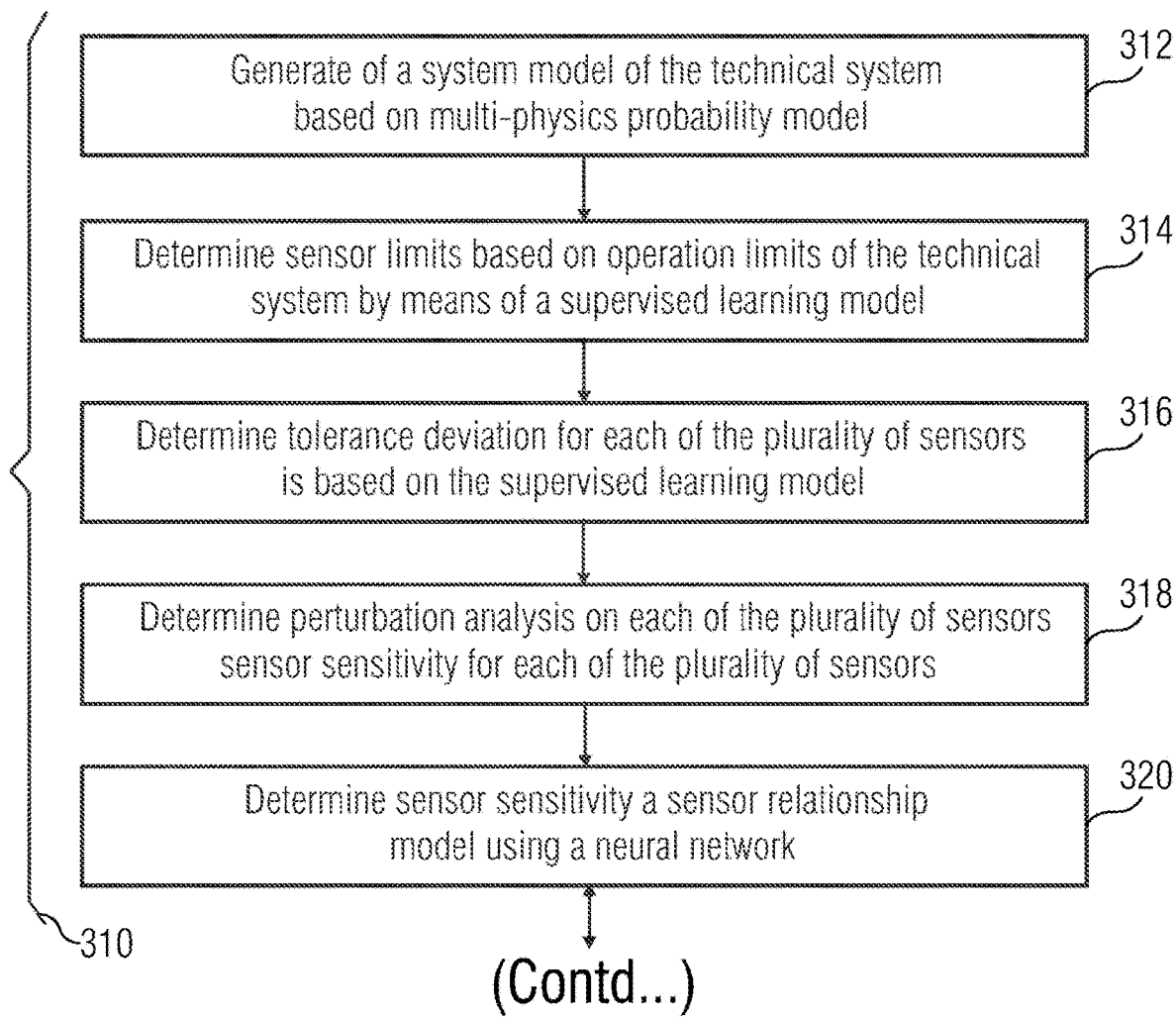
FIG. 3 is a flowchart illustrating one embodiment of a method controlling a technical system having a plurality of sensors.

FIG. 3 is a flowchart 300 that illustrates one embodiment of a method of controlling a technical system having a plurality of sensors. As show in the flowchart 300, the method is divided into two phases, a pre-operation phase 310 and an operation phase 350. The pre-operation phase 310 indicates the acts that are performed during a testing phase of the technical system.

The pre-operation phase 310 begins at act 312 with the generation of a system model of the technical system based on multi-physics probability model. The system model includes virtual sensor data for each sensor of the plurality of sensors. The system model is also updated with sensor data from the plurality of sensors to reflect a current state of the technical system.

At act 314, sensor limits based on operation limits of the technical system are determined by a supervised learning model. Further, at act 316, a tolerance deviation for each sensor of the plurality of sensors is determined based on the supervised learning model. The tolerance deviation is an acceptable deviation from the sensor limits.

At act 318, a perturbation analysis is performed on each sensor of the plurality of sensors to determine sensor sensitivity for each of the plurality of sensors. The perturbation analysis allows study of changes in characteristics of a function when small perturbations are seen in the function's parameters. In other words, the perturbation analysis refers to how a neural network output is influenced by input and/or weight perturbations (e.g., how the system model varies based on the changes in the sensor datasets). In an embodiment, the perturbation analysis involves measurement of the sensitivities based on the evaluation of the Taylor Series Expansion (TSE) of the cost function that is the Residual Sum-of-Squares (RSS), with appropriate approximations that are necessary for the application.

At act 320, based on the sensor sensitivity, a sensor relationship model is determined using a neural network. The sensor relationship model is used in the operation phase 350 to validate a sensor anomaly.

During the operation phase 350, at act 330, a sensor anomaly is detected when a sensor fails to generate sensor data. There are several instances when the sensor fails to generate the sensor data at a time instance. The sensor failure may be attributed to the sensor being jammed or damaged and therefore, is unable to generate the sensor data or generates anomalous sensor data for that time instant. In another example, the sensor is configured to generate the sensor data at a preset time interval and is unable to generate the sensor data for the time instance.

At act 340, the sensor anomaly is validated by comparing the sensor data and the virtual sensor data of the system model. Further, the validation is performed based on the sensor relationship model generated at act 320. For example, the anomaly is detected in a first sensor. The detection of one or more anomalies in the sensor data from sensors surrounding the first sensor may be used to validate a first sensor anomaly. Alternatively, the sensor data from the sensors surrounding the first sensor is aligned with the virtual sensor data, except for the first sensor data. Then, the first sensor anomaly may be validated. Accordingly, the sensor relationship model is used to validate sensor anomaly.

If the sensor anomaly is validated, then act 342 is performed. At act 342, the virtual sensor data is selected in lieu of the sensor data that is generated. Further, a control command is generated to the technical system based on the virtual sensor data. Accordingly, the system model is dynamically configured to generate the virtual sensor data at a time instant when the plurality of sensors fail to generate the sensor data. At act 344, the technical system operation is controlled by updating input parameters associated with operation of the technical system based on the system model. The change in the input parameters to the technical system effects a change in the sensor data.

If the sensor anomaly is not validated, then at act 346, a virtual sensor anomaly is determined. At act 348, a degradation model of the technical system is provided to the system model such that the degradation model reflects the current state of the technical system accurately.

Figure 4:
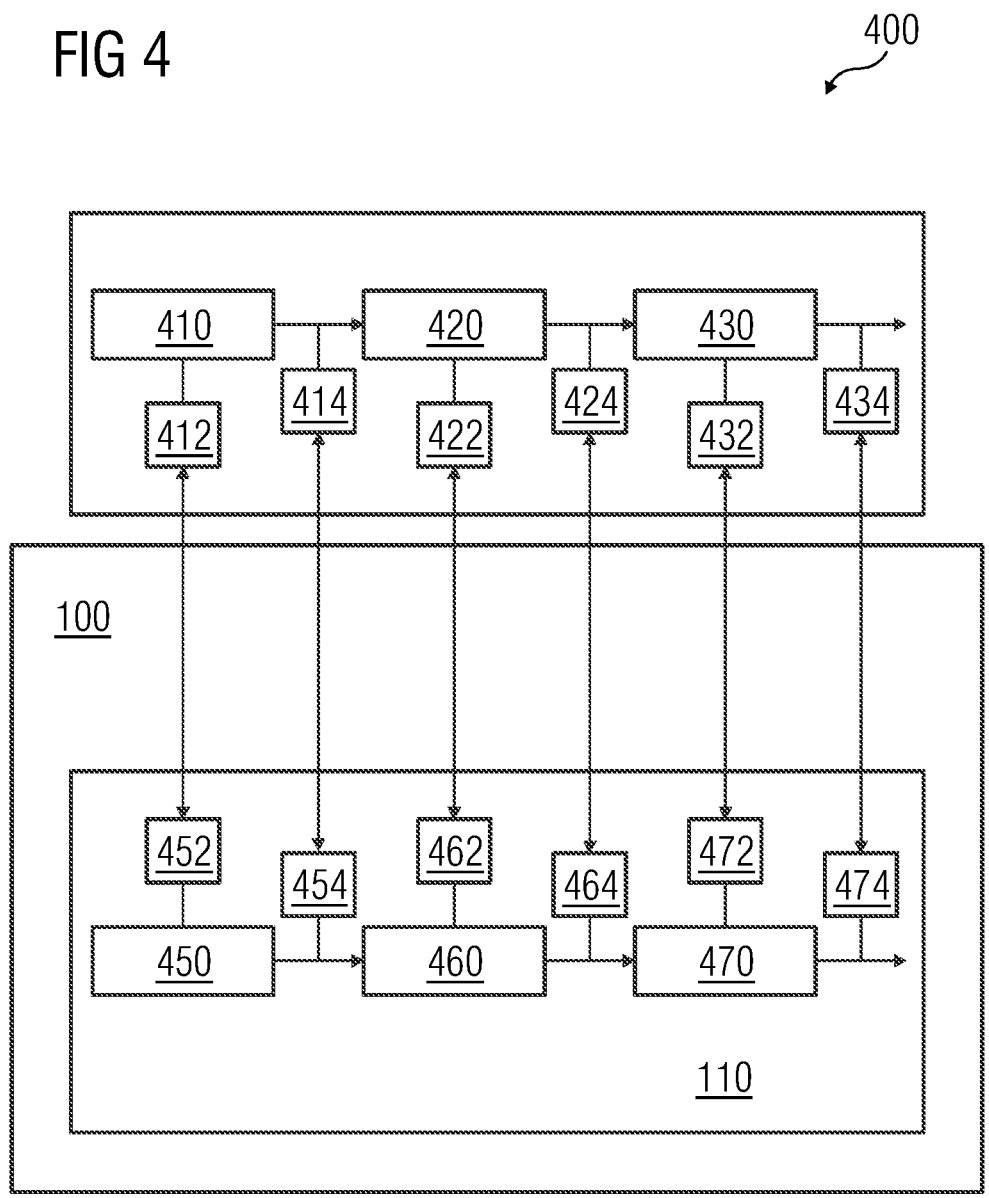
FIG. 4 illustrates one embodiment of an industrial process including multiple technical systems.

The control unit 100 and the method described in flowchart 300 may also be used to control processes that include several technical systems. FIG. 4 illustrates an industrial process 400 including multiple technical systems 410, 420 and 430. The control unit 100 is used to control the industrial process 400. The control unit 100 includes a model generator module 110 that generates system models 450, 460 and 470 for each of the technical systems 410, 420 and 430, respectively.

Sensor data 414, 424 and 434 of the technical systems 410, 420 and 430 represent the input/output of a subsequent technical system. For example, the sensor data 414 of the technical system 410 is the input for the technical system 420. The sensor data 412-434 is compared with virtual sensor data 452-474 in the system models 450, 460 and 470. If a deviation more than the pre determined tolerance deviation occurs, then the control unit 100 performs the act as in FIG. 3 to determine the sensor with the anomaly and accordingly determines the faulty technical system. If a fault is determined, the control unit 100 uses the virtual sensor data 452-474 instead of the sensor data 412-434. The input/output values are updated to the subsequent technical system (e.g., 430) and in the system model 460.

The various methods, algorithms, and modules disclosed herein may be implemented on computer readable media appropriately programmed for computing devices. The modules that implement the methods and algorithms disclosed herein may be stored and transmitted using a variety of media (e.g., the computer readable media) in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the modules including computer executable instructions may be implemented in any programming language. The modules may be stored on or in one or more mediums as object code. Various aspects of the method and system disclosed herein may be implemented in a non-programmed environment including documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof.

Where databases including data points are described, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention may be configured to work in a network environment including one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices includes processors, some examples of which are disclosed above, that are adapted to communicate with the computers. In an embodiment, each of the computers is equipped with a network communication device (e.g., a network interface card, a modem, or other network connection device suitable for connecting to a network). Each of the computers and the devices executes an operating system, some examples of which are disclosed above. While the operating system may differ depending on the type of computer, the operating continues to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems (e.g., servers configured to provide one or more services to one or more client computers, or to perform a complete task in a distributed system). For example, one or more aspects of the present invention may be performed on a client-server system that includes components distributed among one or more server systems that perform multiple functions according to various embodiments. These components include, for example, executable, intermediate, or interpreted code that communicates over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto, and changes may be made without departing from the scope and spirit of the invention in its aspects.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling operation of a technical system comprising a plurality of sensors, the method comprising:
generating a system model of the technical system based on a multi-physics probability model in a pre-operation phase of the technical system, wherein the system model is a high fidelity simulation model of the technical system generated based on Bayesian calibration, wherein the system model comprises virtual sensor data for each sensor of a plurality of sensors associated with the technical system, and wherein the virtual sensor data comprises virtual first sensor data;
receiving first sensor data from a first sensor of the plurality of sensors, in an operation phase of the technical system;
detecting a first sensor anomaly based on failure of the first sensor to generate the first sensor data, wherein failure of the first sensor comprises generation of anomalous first sensor data;
validating the first sensor anomaly based on a comparison between the first sensor data and the virtual first sensor data;
validating the first sensor anomaly based on a sensor relationship model, when sensor data from other sensors of the plurality of sensors surrounding the first sensor is aligned with the virtual sensor data, except for the first sensor data; and
generating a control command to the technical system, the generating of the control command comprising replacing the virtual first sensor data in lieu of the first sensor data when the first sensor anomaly is validated.

2. The method of claim 1, further comprising:
updating the system model with sensor data from the plurality of sensors to reflect a current state of the technical system; and
effecting change in the sensor data, wherein the effecting of change in the sensor data comprises updating input parameters associated with operation of the technical system based on the system model.

3. The method of claim 2, further comprising:
continuing operation of the technical system based on the virtual first sensor data when the first sensor anomaly is validated.

4. The method of claim 2, further comprising:
generating the virtual sensor data at a time instant when the plurality of sensors fail to generate the sensor data.

5. The method of claim 1, further comprising:
determining sensor limits based on operation limits of the technical system using a supervised learning model; and
determining a tolerance deviation for each sensor of the plurality of sensors based on the supervised learning model, wherein the tolerance deviation is an acceptable deviation from the sensor limits.

6. The method of claim 5, wherein the detecting of the first sensor anomaly based on failure of the first sensor to generate the first sensor data comprises:
comparing a deviation between the first sensor data and the virtual first sensor data with the tolerance deviation; and
detecting the first sensor anomaly when the deviation exceeds the tolerance deviation.

7. The method of claim 1, further comprising:
detecting a virtual first sensor anomaly when the first sensor anomaly validation is false; and
updating a system model of the technical system with a degradation model associated with the technical system when the virtual first sensor anomaly detection is continuous.

8. The method of claim 1, further comprising:
determining a sensor sensitivity for each sensor of the plurality of sensors, the determining of the sensor sensitivity comprising performing a perturbation analysis on each sensor of the plurality of sensors; and
generating the sensor relationship model between the plurality of sensors based on the sensor sensitivity using a neural network.

9. A controller for controlling operation of a technical system including a plurality of sensors, the controller comprising:
a receiver configured to receive sensor data from the plurality of sensors, wherein the sensor data includes first sensor data from a first sensor of the plurality of sensors;
at least one processor; and
a memory communicatively coupled to the at least one processor, the memory comprising:
a model generator module configured to generate a system model of the technical system based on a multi-physics probability model in a pre-operation phase of the technical system, wherein the system model comprises virtual sensor data for each sensor of the plurality of sensors, wherein the system model is a high fidelity simulation model of the technical system generated based on Bayesian calibration, and wherein the virtual sensor data comprises virtual first sensor data, and wherein the model generator module is operable to update the system model with sensor data from the plurality of sensors to reflect a current state of the technical system;

an anomaly detection module configured to detect a first sensor anomaly based on failure of the first sensor to generate the first sensor data;

a validation module configured to validate the first sensor anomaly based on a comparison between the first sensor data and virtual first sensor data and to validate the first sensor anomaly based on a sensor relationship model, when the sensor data from other sensors of the plurality of surrounding the first sensor is aligned with the virtual sensor data, except for the first sensor data; and a sensor selection module configured to output the virtual first sensor data in lieu of the first sensor data when the first sensor anomaly is validated, wherein the at least one processor is configured to generate a control command to the technical system based on the virtual first sensor data, the generation of the control command comprising replacement of the virtual first sensor data in lieu of the first sensor data when the first sensor anomaly is validated.

10. The controller of claim 9, wherein the anomaly detection module comprises:

a virtual anomaly detection module configured to detect a virtual first sensor anomaly when the first sensor anomaly validation is false, wherein a system model of the technical system is updated with a degradation model associated with the technical system when the virtual first sensor anomaly is detected.

11. The controller of claim 9, wherein the memory further comprises:

a model generator module configured to generate a system model of the technical system based on a multi-physics probability model, wherein the system model comprises virtual sensor data for each sensor of the plurality of sensors, and wherein the virtual sensor data comprises the virtual first sensor data, and wherein the model generator module is operable to update the system model with sensor data from the plurality of sensors to reflect a current state of the technical system.

12. The controller of claim 9, wherein the memory further comprises:

a sensor limit module configured to determine sensor limits based on operation limits of the technical system using a supervised learning model; and a tolerance deviation module configured to determine a tolerance deviation for each sensor of the plurality of sensors based on the supervised learning model, wherein the tolerance deviation is acceptable deviation from the sensor limits.

13. The controller of claim 9, wherein the memory further comprises:

a sensor sensitivity module configured to perform a perturbation analysis on each sensor of the plurality of sensors to determine sensor sensitivity for each sensor of the plurality of sensors; and a sensor relationship module configured to generate the sensor relationship model between the plurality of sensors based on the sensor sensitivity using a neural network.

14. The controller of claim 13, wherein the validation module is configured to validate the first sensor anomaly based on the sensor relationship model.

15. A system for controlling operation of an automation process, the system comprising:

a server operable on a cloud computing platform;

a network interface communicatively coupled to the server; and at least one technical system communicatively coupled to the server via the network interface, the at least one technical system comprising a plurality of sensors configured to generate at least one sensor dataset comprising sensor data corresponding to at least one operation parameter associated with the at least one technical system, wherein the server includes at least one controller for controlling operation of the at least one technical system, the controller comprising:

a receiver configured to receive sensor data from the plurality of sensors, wherein the sensor data includes first sensor data from a first sensor of the plurality of sensors;

at least one processor; and a memory communicatively coupled to the at least one processor, the memory comprising:

a model generator module configured to generate a system model of the technical system based on a multi-physics probability model in a pre-operation phase of the technical system, wherein the system model is a high fidelity simulation model of the technical system generated based on Bayesian calibration, wherein the system model comprises virtual sensor data for each sensor of the plurality of sensors, and wherein the virtual sensor data comprises virtual first sensor data, and wherein the model generator module is operable to update the system model with sensor data from the plurality of sensors to reflect a current state of the technical system;

an anomaly detection module configured to detect a first sensor anomaly based on failure of the first sensor to generate the first sensor data;

a validation module configured to validate the first sensor anomaly based on a comparison between the first sensor data and virtual first sensor data and to validate the first sensor anomaly based on a sensor relationship model, when the sensor data from other sensors of the plurality of surrounding the first sensor is aligned with the virtual sensor data, except for the first sensor data; and a sensor selection module configured to output the virtual first sensor data in lieu of the first sensor data when the first sensor anomaly is validated, wherein the at least one processor is configured to generate a control command to the technical system based on the virtual first sensor data, the generation of the control command comprising replacement of the virtual first sensor data in lieu of the first sensor data when the first sensor anomaly is validated.

16. The system of claim 15, wherein the anomaly detection module further comprises:

a virtual anomaly detection module configured to detect a virtual first sensor anomaly when the first sensor anomaly validation is false, wherein a system model of the technical system is updated with a degradation model associated with the technical system when the virtual first sensor anomaly is detected.

* * * * *